United States Patent
Cosgrove et al.

(10) Patent No.: US 10,889,162 B2
(45) Date of Patent: Jan. 12, 2021

(54) VEHICLE COMPONENT COOLING THROUGH DIRECTED HVAC COOLING AND OPERATION

(71) Applicant: Toyota Motor Engineering & Manufacturing North America, Inc., Plano, TX (US)

(72) Inventors: David W. Cosgrove, Milford, MI (US); Hidekazu Hirabayashi, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 131 days.

(21) Appl. No.: 16/168,789

(22) Filed: Nov. 16, 2018

(65) Prior Publication Data
US 2020/0156442 A1    May 21, 2020

(51) Int. Cl.
| | |
|---|---|
| *B60H 1/32* | (2006.01) |
| *B60H 1/00* | (2006.01) |
| *B60H 1/24* | (2006.01) |
| *B60L 58/26* | (2019.01) |
| *B60L 58/33* | (2019.01) |
| *H01M 10/625* | (2014.01) |

(52) U.S. Cl.
CPC ..... *B60H 1/00878* (2013.01); *B60H 1/00278* (2013.01); *B60H 1/00385* (2013.01); *B60H 1/00564* (2013.01); *B60H 1/246* (2013.01); *B60L 58/26* (2019.02); *B60L 58/33* (2019.02); *H01M 10/625* (2015.04)

(58) Field of Classification Search
CPC .......... B60H 1/00271; B60H 1/00278; B60H 1/00385; B60L 58/24; B60L 58/26; B60L 58/27; B60L 58/32; B60L 58/33; H01M 10/625; H01M 10/663
See application file for complete search history.

(56) References Cited

U.S. PATENT DOCUMENTS

| | | | |
|---|---|---|---|
| 7,013,659 B2 | 3/2006 | Yoshida et al. |
| 7,686,111 B2 | 3/2010 | Koenekamp et al. |
| 7,819,172 B2 | 10/2010 | Otsuka et al. |
| 7,988,543 B2 | 8/2011 | Major |
| 8,029,343 B2 | 10/2011 | Major et al. |
| 8,047,318 B2 | 11/2011 | Zhu et al. |

(Continued)

*Primary Examiner* — Jonathan Bradford
(74) *Attorney, Agent, or Firm* — Snell & Wilmer LLP

(57) ABSTRACT

A system for vehicle component cooling includes a main body defining a passenger compartment to support passengers of the vehicle. The system also includes a heating, ventilation, and air conditioning (HVAC) unit to output conditioned air into the passenger compartment. The system also includes a vehicle component to generate heat and having a component temperature. The system also includes a cooling channel having an inlet located in the passenger compartment and an outlet to output the conditioned air from the passenger compartment towards the vehicle component. The system also includes at least one sensor to detect data corresponding to the component temperature of the vehicle component. The system also includes an electronic control unit (ECU) to control the HVAC unit to increase or decrease a cabin temperature to adjust the component temperature based on the detected data.

20 Claims, 6 Drawing Sheets

(56) References Cited

U.S. PATENT DOCUMENTS

| | | |
|---|---|---|
| 8,820,815 B2 | 9/2014 | Krenz et al. |
| 9,300,017 B2 | 3/2016 | Cardoso et al. |
| 9,947,975 B2 | 4/2018 | Porras et al. |
| 2008/0202137 A1 | 8/2008 | Inoue |
| 2009/0176150 A1* | 7/2009 | Yanaka ............... H01M 10/486 429/120 |
| 2011/0059341 A1* | 3/2011 | Matsumoto ............. B60L 58/10 429/82 |
| 2013/0122338 A1 | 5/2013 | Katayama et al. |
| 2014/0196866 A1 | 7/2014 | Bezzina et al. |
| 2017/0297407 A1 | 10/2017 | Shan et al. |
| 2018/0015806 A1 | 1/2018 | Yasuda et al. |
| 2018/0097266 A1 | 4/2018 | Jalilevand et al. |

* cited by examiner

VEHICLE COMPONENT COOLING THROUGH DIRECTED HVAC COOLING AND OPERATION

BACKGROUND

1. Field

The present disclosure relates to systems and methods for cooling a vehicle component using a heating, ventilation, and air conditioning (HVAC) unit.

2. Description of the Related Art

Some vehicles provide cooling (or heating) channels between passenger compartments of vehicles and one or more vehicle components. For example, a cooling channel may exist from a passenger compartment of a vehicle to a vehicle battery. The cooling channel may be located under one or more seats of the vehicle, within a vehicle seat, built into a floorboard, or the like.

Conventional vehicles may include a fan near an inlet or an outlet of, or within, a cooling channel. The fan may be controlled to increase or decrease a flow of air over the component. An increase in airflow may decrease the temperature of the component, and a reduction in airflow may increase the temperature of the component.

These conventional systems may provide adequate cooling in some situations; however, they have several drawbacks. For example, fans may be limited in the amount of airflow they can provide based on their size and maximum fan speeds. These fans may be incapable of providing sufficient airflow to cool the components in some situations, such as when a relatively large amount of power is requested of the battery. This lack of cooling may reduce performance of the vehicle, thus reducing vehicle efficiency. If the lack of cooling is sufficiently severe, the vehicle component may be damaged due to the increased heat. Additionally, fans make noise, which increases as the fan speed increases. Thus, when the fan is providing a relatively great amount of airflow, it may create undesirable noise.

In that regard, systems and methods for providing additional cooling of vehicle components is desirable.

SUMMARY

Described herein is a system for vehicle component cooling in a vehicle. The system includes a main body defining a passenger compartment designed to support passengers of the vehicle. The system also includes a heating, ventilation, and air conditioning (HVAC) unit designed to output conditioned air into the passenger compartment. The system also includes a vehicle component designed to generate heat and having a component temperature. The system also includes a cooling channel having an inlet located in the passenger compartment and an outlet designed to output the conditioned air from the passenger compartment towards the vehicle component. The system also includes at least one sensor designed to detect data corresponding to the component temperature of the vehicle component. The system also includes an electronic control unit (ECU) coupled to the HVAC unit, the vehicle component, and the at least one sensor, and designed to control the HVAC unit to increase or decrease a cabin temperature to adjust the component temperature based on the detected data.

Also described is a system for vehicle battery cooling in a vehicle. The system includes a main body defining a passenger compartment designed to support passengers of the vehicle. The system also includes a heating, ventilation, and air conditioning (HVAC) unit designed to output conditioned air into the passenger compartment. The system also includes a battery designed to store electrical energy and having a battery temperature. The system also includes a cooling channel having an inlet located in the passenger compartment and an outlet designed to output the conditioned air from the passenger compartment towards the battery. The system also includes an electronic control unit (ECU) coupled to the HVAC unit and the battery, and designed to determine a battery parameter corresponding to the battery temperature and to control the HVAC unit to increase or decrease a cabin temperature to adjust the battery temperature based on the determined battery parameter.

Also described is a method for vehicle component cooling in a vehicle. The method includes outputting, by a heating, ventilation, and air conditioning (HVAC) unit, conditioned air into a passenger compartment of the vehicle. The method also includes receiving or outputting, by a vehicle component having a component temperature, electrical energy. The method also includes directing, by a fan, the conditioned air from the passenger compartment through a cooling channel towards the vehicle component. The method also includes detecting, by a sensor, data corresponding to the component temperature of the vehicle component. The method also includes controlling, by an electronic control unit (ECU), the HVAC unit to increase or decrease a cabin temperature to adjust the component temperature based on the detected data.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for cooling a vehicle component, such as a battery, using a heating, ventilation, and air conditioning (HVAC) unit of a vehicle. The systems and methods provide various benefits and advantages such as reducing reliance on a fan to cool the vehicle component. The reduced reliance on the fan reduces fan noise in a passenger compartment of the vehicle, thus providing a more enjoyable ride for a driver and the passengers. The reduced reliance on the fan provides the additional benefit of allowing for use of a smaller fan which reduces energy usage (increasing vehicle efficiency) and also reduces the total manufacturing and operating cost of the vehicle.

The systems and methods provide additional benefits such as providing increased cooling of the vehicle component. This increased cooling provides multiple advantages such as causing the battery to operate at a more ideal temperature, thus increasing energy efficiency of the vehicle. The increased cooling advantageously provides for increased towing capacity because the battery can perform more effectively and thus provide more energy for the vehicle. The increased cooling provides the additional benefit of reducing concerns of heat damage to the vehicle component.

An exemplary system includes a main body that defines a passenger compartment in which drivers and passengers may ride, along with a HVAC unit that outputs conditioned air into the passenger compartment. The system further includes a vehicle component, such as a battery, which may provide energy to a motor generator for propelling the vehicle. A cooling channel may exist between the passenger compartment and the battery, and a fan may direct air through the cooling channel towards the battery in order to cool the battery. One or more sensor may detect sensor data that corresponds to a battery temperature of the battery. The system further includes an electronic control unit (ECU) which may increase or decrease the conditioned air flowing from the HVAC unit. This adjustment in the conditioned air results in an adjustment to the battery temperature due to the flow of air through the cooling channel towards the battery.

Figure 1:
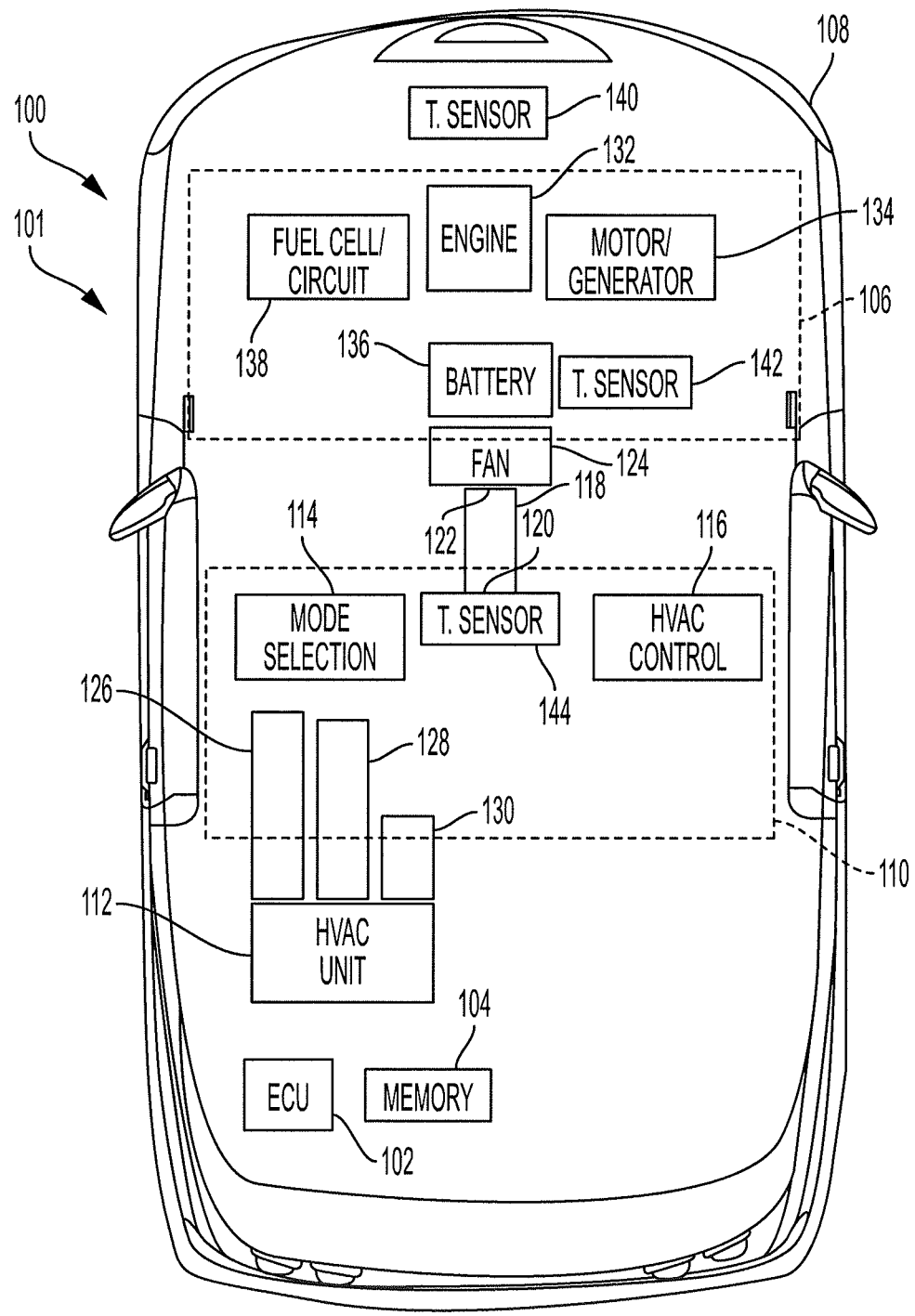
FIG. 1 is a block diagram illustrating a vehicle that includes a system for adjusting a temperature of a vehicle component using a heating, ventilation, and air conditioning (HVAC) unit according to an embodiment of the present invention.

Turning to FIG. 1, a vehicle 100 includes a system 101 for cooling a component of the vehicle 100. The vehicle 100 (or system 101) may include an ECU 102, a memory 104, a power source 106, and a main body 108 that defines a passenger compartment 110. The vehicle 100 (or system 101) may further include a heating, ventilation, and air conditioning (HVAC) unit 112, various user interfaces including a vehicle mode selection input device 114 and a HVAC control input device 116, a cooling channel 118, a fan 124, and one or more sensors.

The main body 108 may be propelled along a roadway, may be suspended in or on water, or may fly through air. The main body 108 may resemble a vehicle such as a car, a motorcycle, a boat, an aircraft, or the like. The main body 108 may further support an individual such as a driver, a passenger, or the like, who may be located in the passenger compartment 110.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operations of components based on the determinations.

The vehicle 100 may be fully autonomous or semi-autonomous. In that regard, the ECU 102 may control various aspects of the vehicle 100 (such as steering, braking, accelerating, or the like) to maneuver the vehicle 100 from a starting location to a destination location. In some embodiments, the vehicle 100 may be used as a rideshare vehicle, in an autonomous, a semi-autonomous, or fully driver-operated state. In that regard, the vehicle 100 may be operated independently of driver control and, occasionally, without a person inside of the passenger compartment 110.

The memory 104 may include any non-transitory memory and may be capable of storing data usable by the ECU 102. For example, the memory 104 may store instructions usable by the ECU 102 to provide cool air to a battery 136, control the power source 106, steering, and braking, or the like.

The power source 106 may include any one or more of an engine 132, a motor-generator 134, the battery 136, or a fuel-cell circuit 138. The engine 132 may convert a fuel into mechanical power for propelling the vehicle 100. In that regard, the engine 132 may be a gasoline engine, a diesel engine, or the like.

The battery 136 may store electrical energy. In some embodiments, the battery 136 may include one or more energy storage devices including a battery, a flywheel, a super capacitor, a thermal storage device, or the like.

The fuel-cell circuit 138 may include a plurality of fuel cells that facilitate a chemical reaction to generate electrical energy. For example, the fuel cells may receive hydrogen and oxygen, facilitate a reaction between the hydrogen and oxygen, and output electricity in response to the reaction. In that regard, the electrical energy generated by the fuel-cell circuit 138 may be stored in the battery 136 and/or used by the motor-generator 134. In some embodiments, the vehicle 100 may include multiple fuel-cell circuits including the fuel-cell circuit 138.

The motor-generator 134 may convert the electrical energy stored in the battery 136 (or electrical energy received directly from the fuel-cell circuit 138) into mechanical power usable to propel the vehicle 100. The motor-generator 134 may further convert mechanical power received from the engine 132 or from wheels of the vehicle 100 into electricity, which may be stored in the battery 136 as energy and/or used by other components of the vehicle 100. In some embodiments, the motor-generator 134 may include a motor without a generator portion and, in some embodiments, a separate generator may be provided.

A user may change a vehicle mode of operation using the mode selection input device 114. The mode selection input device 114 may include one or more buttons, dials, switches, microphones, or the like. The modes may include, for example, a first mode, or an eco-mode, in which the ECU 102 controls the power source 106 to operate efficiently. The modes may further include a second mode, or a normal mode, in which the ECU 102 controls the power source 106 to provide greater acceleration than in the eco-mode. The modes may further include a third mode, or a sport mode, in which the ECU 102 controls the power source 106 to provide greater acceleration than in the normal mode. The amount of power provided by various components of the power source may change based on the mode of operation of the vehicle. For example, the ECU 102 may control the battery 136 to charge and discharge faster when the eco-mode has been selected, such that more power may be provided by the battery 136 than the engine 132 to decrease fuel consumption of the power source 106.

In some embodiments, the vehicle mode of operation may instead correspond to which components of the power source 106 provide greater power. For example, the modes may include a first mode, or an electric only mode, in which the ECU 102 controls the power source 106 such that all power is provided by the battery 136 and the fuel-cell circuit 138 (if present). The modes may also include a second mode, or a hybrid vehicle (HV) mode, in which the ECU 102 controls the power source 106 such that power is provided by the battery 136, the fuel-cell circuit 138, and the engine 132. The modes may also include a third mode, or an engine mode, in which the ECU 102 controls the power source 106 such that all power is provided by the engine 132.

The HVAC unit 112 may output conditioned air into the passenger compartment 110 via one or more ducts including a first duct 126, a second duct 128, and a third duct 130. The various ducts may transfer the conditioned air to various locations within the passenger compartment 110. The conditioned air may be heated, cooled, or both based on user selections and based on data determined by the ECU 102.

A user may make various selections regarding operation of the HVAC unit 112 using the HVAC control input device 116. The HVAC control input device 116 may include one or more buttons, dials, switches, microphones, or the like. The various selections may include a selection of a desired temperature of the conditioned air, a selection of which duct(s) the conditioned air flows through, a selection of a fan speed of air through which the conditioned air flows through the selected duct(s), a selection of whether the HVAC unit 112 receives air from the cabin 110 or outside of the main body 108, a selection of whether air conditioned air is provided, or the like.

The cooling channel 118 may have an inlet 120 and an outlet 122. The inlet 120 may be located in the vehicle cabin 110 and may receive conditioned air from the cabin 110. The outlet 122 may be positioned at a location in which the conditioned air flowing through the cooling channel 118 is directed towards, across, or at the battery 136. The fan 124 may be located near the inlet 120 or the outlet 122 and may direct the conditioned air through the cooling channel 118 and towards the battery 136. The fan 124 may be controlled to operate at any speed within a given speed range, which may be selected based on the physical capabilities of the fan 124.

The battery 136 may perform optimally at a given (optimal) temperature or within a given (optimal) temperature range. The optimal temperature or temperature range may be stored within the memory 104 and may be determined based on the physical characteristics of the battery 136. The optimal temperature may correspond to a temperature at which the battery 136 operates most efficiently, most safely (i.e., without risk of damage to the battery), or the like.

The ECU 102 may control the fan 124 to increase or decrease airflow across the battery 136 in order to increase or decrease a battery temperature of the battery 136. The ECU 102 may do this to cause the temperature of the battery 136 to reach or move towards the optimal temperature or the optimal temperature range. The ECU 102 may further control operation of the HVAC unit 112 to adjust the conditioned air within the passenger compartment 110 to increase or decrease the battery temperature. Because the airflow from the cooling channel 118 is received from the passenger compartment 110, the temperature and volume of the conditioned airflow into the passenger compartment 110 may adjust the battery temperature.

Although the present disclosure describes adjusting a battery temperature in this manner, one skilled in the art will realize that a vehicle may include a similar system usable to adjust a temperature of any other vehicle component. For example, a similar system may be used to adjust a temperature of vehicle electronics (such as the ECU 102, an inverter, or the like), the fuel-cell circuit 138, or any other vehicle component.

Figure 2:
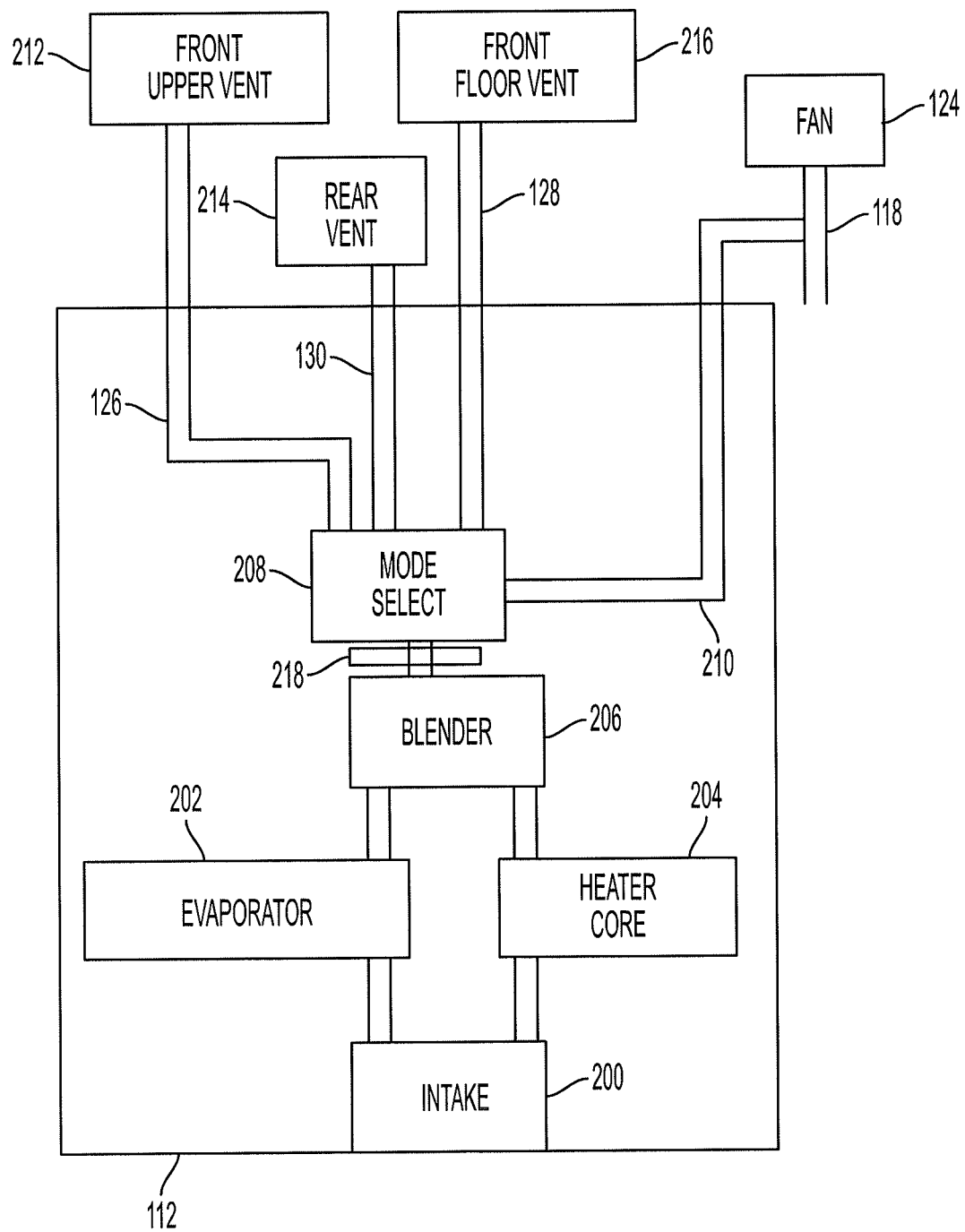
FIG. 2 is a block diagram illustrating various components of the HVAC unit of FIG. 1 according to an embodiment of the present invention.

Referring now to FIGS. 1 and 2, additional details of the HVAC unit 112 are shown. In particular, the HVAC unit 112 may receive air via an intake 200. The intake 200 may be adjusted to receive air from the vehicle cabin 110 (recycled), from a location outside of the vehicle cabin 110 (fresh), or a blend of recycled and fresh air. A first portion of the air may flow through an evaporator 202, which may include or receive a coolant, in order to reduce a temperature of the first portion of the air. In some embodiments, the evaporator 202 may only operate when an air conditioning mode of the HVAC unit 112 is selected. A second portion of the air may flow through a heater core 204, which may receive heated air or fluid, in order to increase a temperature of the second portion of the air.

A blender 206 may receive one or both of the first portion of the air or the second portion of the air and may include one or more valves or other flow control device to provide a desired blend of the first portion of the air and the second portion of the air. The blender 206 may be controlled to adjust the blend based on a desired temperature of the conditioned air to be output by the HVAC unit 112. For example, if the desired temperature is greater than a current temperature, then the blender 206 may be controlled to provide a greater amount of airflow from the heater core 204 than a current blend. Likewise, if the desired temperature is less than a current temperature, then the blender 206 may be controlled to provide a greater amount of airflow from the evaporator 202.

A fan 218 may direct airflow from the blender 206 through the HVAC unit 112 and into the passenger compartment 110. The speed of the fan 218 may be adjusted based on user input received by the HVAC control user input 116 or based on a control instruction from the ECU 102. An increase in the speed of the fan 218 may result in increased conditioned air flowing from the HVAC unit 112 into the passenger compartment 110.

A mode select unit 208 may include one or more valves or other airflow control component. The mode select unit 208 can route the conditioned air through any one or more of the ducts 126, 128, 130. The ECU 102 may select one or more duct 126, 128, 130 through which the conditioned air may flow based on user input or based on a desired temperature of the battery 136. The ECU 102 can also control the amount of air flowing through each duct. For example, duct 126 can receive 20% of the air, duct 128 can receive 30% of the air, and duct 130 can receive 50% of the air.

Conditioned air flowing through the first duct 126 may be directed through a front upper vent 212 within the passenger compartment 110. Conditioned air flowing through the second duct 128 may be directed through a front floor vent 216 within the passenger compartment 110. Conditioned air flowing through the third duct 130 may be directed through a rear vent 214 within the passenger compartment 110. A vehicle may include any one or more ducts that direct air through any one or more vent, or combination of vents. The vents can be used to control the amount of air flowing or travelling through each duct.

In some embodiments, the mode select unit 208 may direct air through a fourth duct 210. The duct 210 may be in fluid communication with the cooling channel 118 and may provide air directly from the HVAC unit 112 to the cooling channel 118 to be directed towards the battery 136. In that regard, if more cooling is desired for the battery 136 than the cabin 110, the ECU 102 may direct cool air to the cooling channel 118 rather than into the cabin 110.

As mentioned above, situations may occur in which more (or less) cooling is desired of the battery 136 than in the passenger compartment 110. In some embodiments, the ECU 102 may direct cooler air through the fourth duct 210 to compensate for the discrepancy. In some embodiments, the ECU 102 may prioritize cooling of the battery 136 over the passenger compartment, and may control the HVAC unit 112 to cause the battery 136 to reach the optimal temperature. In some embodiments, the ECU 102 may select or calculate a temperature of air to be provided by the HVAC unit 112 that is between that which would cause the battery 136 to reach the optimal temperature and that which would cause the passenger compartment 110 to reach the desired temperature. For example, the ECU 102 may select a temperature directly between the two values, may select a temperature that is closer to that which would cause the battery 136 to reach the desired temperature, and/or may select a temperature that is closer to that which would cause the passenger compartment 110 to reach the desired temperature.

In some embodiments, the vehicle 100 may be operated without a driver or a passenger present. In such situations, the ECU 102 may control the HVAC unit 112 to provide air at a temperature that would cause the battery 136 to reach the optimal temperature without concern for a temperature within the passenger compartment 110.

Returning reference to FIG. 1, the sensors of the vehicle 100 may include any quantity or type of sensor usable to detect data that corresponds (directly or indirectly) to the temperature of the battery 136. For example, the sensors may include temperature sensors, flow sensors, voltage sensors, current sensors, or the like. In some embodiments, the battery 136 may include one or more current sensors, voltage sensors, or the like. The value of such sensors may correspond to the temperature of the battery 136.

The sensors may further include a temperature sensor 140 positioned in such a location as to detect an ambient temperature in or around the main body 108. The sensors may further include a temperature sensor 142 located in or on the battery 136 that detects the battery temperature. The temperature sensor 142 may include a single temperature sensor located in or on the battery 136, a single temperature sensor or multiple temperature sensors that each correspond to a cell or module of the battery 136, or the like. The sensors may further include a temperature sensor 144 located at the inlet 120 of the cooling channel 118. The sensors may further include one or more temperature sensor designed to detect a temperature of water in the engine 132, oil in the engine 132, a temperature of a transmission, a temperature of the motor generator 134, or the like.

Each of these items of detected data may correspond to a temperature of the battery 136. For example, an increase in any detected temperature may correspond to an increase in battery temperature. Additionally, a change in voltage of the battery 136 may indicate that the battery 136 is charging or discharging, and thus the battery temperature is increasing. Similarly, an increase in battery current may indicate an increase in battery temperature. The systems and methods described herein can be implemented during charging and/or discharging of the battery 136. For example, the ECU 102 may control the HVAC unit 112 to provide air to cool the battery 136 and maintain the battery 136 at the optimal temperature or temperature range during charging and/or discharging.

The optimal battery temperature may remain constant over time or may be variable over time. For example, the optimal battery temperature may fluctuate based on an amount of power requested from the battery 136, based on an ambient temperature, or the like.

The ECU 102 may determine or predict the temperature of the battery 136 based on the data received from one or more of the vehicle sensors. The ECU 102 may determine or predict the optimal battery temperature and the current battery temperature, and may control the HVAC unit 112 based on a difference between the optimal battery temperature and the current battery temperature.

For example and referring to FIGS. 1 and 2, if the ECU 102 determines that the current battery temperature is less than the optimal battery temperature then the ECU 102 may control the blender 206 to cause more of the air to flow through the heater core 204. As another example, if the ECU 102 determines that the current battery temperature is greater than the optimal battery temperature then the ECU 102 may control the blender 206 to cause more of the air to flow through the evaporator 202. The ECU 102 may further control the fan 218 to increase the airflow from the HVAC unit 112, and may further control the mode select unit 208 to direct more of the air through the rear vent 214 and the front floor vent 216. In some embodiments, the ECU 102 may further increase the speed of the fan 124, or may cause the mode select unit 208 to direct more air through the fourth duct 210.

In some embodiments, the ECU 102 may determine one or more battery parameters that correspond to the battery temperature in addition to, or instead of, receiving sensor data corresponding to the battery temperature. For example, the one or more battery parameters may include a vehicle mode of operation, a speed of the fan 124, a state of charge (SOC) of the battery 136, or a calculated temperature of the battery 136. The ECU 102 may calculate a temperature of the battery 136 based on information such as a power request of the battery 136, a current flow through the battery 136, a voltage of the battery 136, or the like.

Each of these battery parameters may affect or correspond to the battery temperature. For example, if the vehicle mode of operation is an electric only mode, then the ECU 102 may assume that the battery temperature is greater than if the vehicle mode of operation is a hybrid mode. As another example, if the vehicle mode of operation is a power mode, then the ECU 102 may assume that the battery temperature is greater than if the vehicle mode of operation is a normal mode. As another example, if the vehicle mode of operation is an eco-mode, then the ECU 102 may assume that the battery temperature is greater than if the vehicle mode is the normal mode, because the battery 136 may be recharged and depleted more often.

The ECU 102 may control the fan speed of the fan 118 independently from operation of the HVAC unit 112. In that regard, an increase in the fan speed of the fan 118 may be indicative of an increase in battery temperature.

A change of SOC of the battery 136 may further be used to determine temperature fluctuations of the battery 136. For example, if the SOC remains constant then the ECU 102 may assume that no power is being provided to, or drawn from, the battery 136 and, thus, the battery temperature remains constant. However, if the SOC is increasing or decreasing, then the ECU 102 may assume that battery temperature is likewise increasing due to the charge or discharge event.

The ECU 102 may perform an algorithm or a method to provide this component temperature adjustment. For example and referring now to FIGS. 3A and 3B, a method 300 may be used to increase or decrease a temperature of a component of a vehicle, such as a battery, a transformer, or the like. The method 300 may be performed, for example, by a vehicle similar to the vehicle 100 of FIG. 1, and a system similar to the system 101 of FIG. 1. Although the flowcharts are directed specifically towards adjusting a temperature of the vehicle battery, one skilled in the art will realize that the methods may be applied to adjust a temperature of any other vehicle component.

In block 302, a HVAC unit may output conditioned air into a passenger compartment of the vehicle. The HVAC unit may be controlled based on HVAC control user inputs, by an ECU, or the like. For example, a user may select a desired temperature using the HVAC control user inputs and the ECU may control components of the HVAC unit (such as an evaporator, a blender, a mode select, or the like) to cause the temperature in the passenger compartment to reach or move towards the user-desired temperature.

In block 304, electrical energy may be stored in a vehicle battery. For example, the electrical energy may be received from a wall charger, may be received from a motor generator during regenerative braking, or the like. The electrical energy stored in the battery may be used for various purposes. For example, the electrical energy may be used by the motor generator to propel the vehicle. The electrical energy may further be used by electronic components of the vehicle such as a HVAC unit, an ECU, sensors, or the like.

In block 306, the conditioned air from the passenger compartment may be directed through a cooling channel towards the vehicle battery. The air may be directed through the cooling channel in any one or more ways. For example, the pressure of the air in the passenger compartment may cause the air to flow through a cooling channel towards the vehicle battery, such as the cooling channel 118 of FIG. 1. As another example, a fan, such as the fan 124 of FIG. 1, may be located near the cooling channel and may direct the air through the cooling channel towards the vehicle battery. This air flowing through the cooling channel may be greater than or less than the battery temperature and, thus, may increase or decrease the battery temperature.

In block 308, one or more sensors of the vehicle may detect sensor data that corresponds to a battery temperature of the battery. The sensors may include one or more temperature sensors which may detect a temperature within or outside of the vehicle, such as the battery temperature, a temperature of an inlet or an outlet of the cooling channel, a temperature of an engine, an ambient temperature within the passenger compartment or outside of the passenger compartment, or the like. The sensors may further include a voltage or current sensor designed to detect a voltage or a current that corresponds to the battery. For example, the battery may include an internal voltage sensor, an internal current sensor, an external voltage sensor, an external current sensor, or the like.

In some embodiments, the sensor data may corresponds directly to the battery temperature. In some embodiments, the ECU may perform one or more calculations using the sensor data to determine additional data that corresponds to the battery temperature. For example, the ECU may perform a calculation using the battery current or the battery voltage to determine a SOC of the battery which corresponds to the battery temperature. As another example, the ECU may use the battery current or the battery voltage which may directly or indirectly correspond to the battery temperature.

In block 310, the ECU may compare each item of the sensor data (or the data that is calculated based on the sensor data) to a corresponding detected data threshold. In some embodiments, the ECU may only perform blocks 310 through 320 after determining that the fan in or near the cooling channel is blowing at a maximum fan speed. The maximum fan speed may be based on physical characteristics of the fan (such as a maximum speed at which the fan may safely operate). The maximum fan speed may also or instead be based on other characteristics of the fan (such as a fan speed above which noise from the fan reaches a detectable or otherwise undesirable level for a driver or passenger).

A memory or the ECU may store one or more detected data thresholds that each correspond to an item of the sensor data. For example, the memory may store a first detected data threshold that corresponds to a detected battery temperature, a second detected data threshold that corresponds to an ambient temperature, a third detected data threshold that corresponds to a temperature of air at the inlet to the cooling channel, or the like. Each of the detected data thresholds may correspond to a sensor value above which additional cooling of the battery is desired.

For example, a detected battery temperature threshold may be a battery temperature above which the battery performance is reduced. Similarly, a detected engine temperature threshold may correspond to an engine temperature above which it is assumed that the battery temperature is greater than the battery temperature threshold.

In some embodiments, the memory may store multiple thresholds that each correspond to one item of sensor data. For example, the memory may store three detected battery temperature thresholds that each correspond to different battery temperatures. A first detected battery temperature threshold may correspond to a first battery temperature above which the battery performance is reduced by a first amount. A second detected battery temperature threshold may correspond to a second battery temperature above which battery performance is reduced by a second amount that is greater than the first amount. A third detected battery temperature threshold may correspond to a third battery temperature above which the battery may be subject to temperatures which may damage the battery.

In block 312, the ECU may increase a counter when an item of sensor data reaches or exceeds the corresponding detected data threshold. For example, if the detected battery temperature reaches or exceeds a detected battery temperature threshold then the ECU may increase the counter by one. If a detected cooling channel inlet temperature reaches or exceeds a detected cooling channel inlet temperature threshold then the ECU may increase the counter by one such that the value of the counter is now equal to two.

If multiple detected data thresholds exist for each item of sensor data then the ECU may increase the counter by more than one if a higher detected data threshold is reached or exceeded. Continuing the example of the three battery temperature thresholds, if the second battery temperature threshold is reached or exceeded then the ECU may increase the counter by two. If the third battery temperature threshold is reached or exceeded then the ECU may increase the counter to a maximum counter value to ensure that immediate cooling of the battery is achieved.

In block 314, the ECU may determine or receive one or more items of battery parameter data that each corresponds to the battery temperature. For example, the battery parameter data may include a speed of the fan that directs air through the cooling channel, a SOC of the battery, a vehicle mode (such as eco-mode, normal mode, sport mode, electric vehicle mode, hybrid mode, or the like), a calculated battery temperature (such as calculated based on detected data, power requests of the battery, or the like), or the like.

Each of the one or more items of battery parameter data may corresponds directly or indirectly to the battery temperature. For example, an increased fan speed may correspond to an increased battery temperature as the increase of the fan speed may be performed based on an increased detected or determined battery temperature. Similarly, a relatively rapid increase or decrease in the SOC of the battery may correspond to an increased battery temperature because charging and discharging of the battery heats the battery.

In block 316, the ECU may compare each item of battery parameter data to a corresponding determined parameter threshold. This may be performed in a similar manner as the comparison of sensor data to detected data thresholds in block 310. One or more determined parameter thresholds may correspond to each item of battery parameter data. For example, a fan speed threshold may corresponds to a fan speed above which additional battery cooling is desired and the ECU may compare the fan speed to the fan speed threshold. As another example, the memory may store a first fan speed threshold, a second fan speed threshold, and a first fan speed threshold. The ECU may determine whether the determined fan speed reaches or exceeds any of the fan speed thresholds.

In block 318, the ECU may increase the counter when an item of battery parameter data reaches or exceeds the corresponding determined parameter threshold. For example, the ECU may increase the counter by one if the fan speed reaches or exceeds the first fan speed threshold. As another example, the ECU may increase the counter by two if the fan speed reaches or exceeds the second fan speed threshold.

In some embodiments, one or more detected data thresholds or determined parameter thresholds may have a different counter value than one or more other thresholds. For example, if a detected battery temperature reaches or exceeds the detected battery temperature threshold then the ECU may increase the counter by two, and if a determined fan speed reaches or exceeds the determined fan speed threshold then the ECU may increase the counter by one.

In some embodiments, one or more detected data thresholds or determined parameter thresholds may correspond to a negative counter value. For example, a low battery temperature threshold may correspond to a battery temperature below which it is desirable to increase the battery temperature. In that regard, the ECU may decrease the counter by one or more if the detected battery temperature reaches or drops below the low battery temperature threshold.

In block 320, the ECU may control the HVAC unit to increase or decrease the cabin temperature based on the value of the counter. For example, if the counter has a positive value then the ECU may control the HVAC unit to decrease the cabin temperature. If the counter has a negative value then the ECU may control the HVAC unit to increase the cabin temperature. One skilled in the art will realize that the selection of positive and negative counter values can be switched without departing from the scope of the present invention. Additionally and in some embodiments, the ECU may only determine whether to decrease the battery temperature.

The ECU may control the HVAC unit differently based on the value of the counter. For example, if the counter value is equal to zero then the ECU may allow the HVAC unit to operate exactly as requested by the user.

However, if the counter value is equal to one then the ECU may take multiple steps. For example, the ECU may control the HVAC unit to ensure that the air conditioning is turned on (i.e., the evaporator is turned on and blender allows air to flow through the evaporator). The ECU may further control the HVAC unit to ensure that the HVAC unit is set at a maximum cold setting (i.e., the blender allows all of the air that is output by the HVAC unit to flow through the evaporator). The ECU may further control the HVAC unit to ensure that the HVAC mode directs all air to flow to a foot vent, or is set at a bi-level airflow in which all air flows to the foot vent and an upper vent.

If the counter value is equal to two then the ECU may take additional steps. For example, the ECU may take all steps discussed above regarding a counter value equal to one, and may further control a mode select to ensure that the air is flowing to a rear vent (in addition to or instead of the foot vent or the bi-level airflow).

If the counter value is equal to three then the ECU may take even more steps. For example, the ECU may take all steps discussed above regarding a counter value equal to two, and may further control a fan of the HVAC unit to blow at a maximum fan speed to increase airflow of the cold air into the passenger compartment.

Figure 3A:
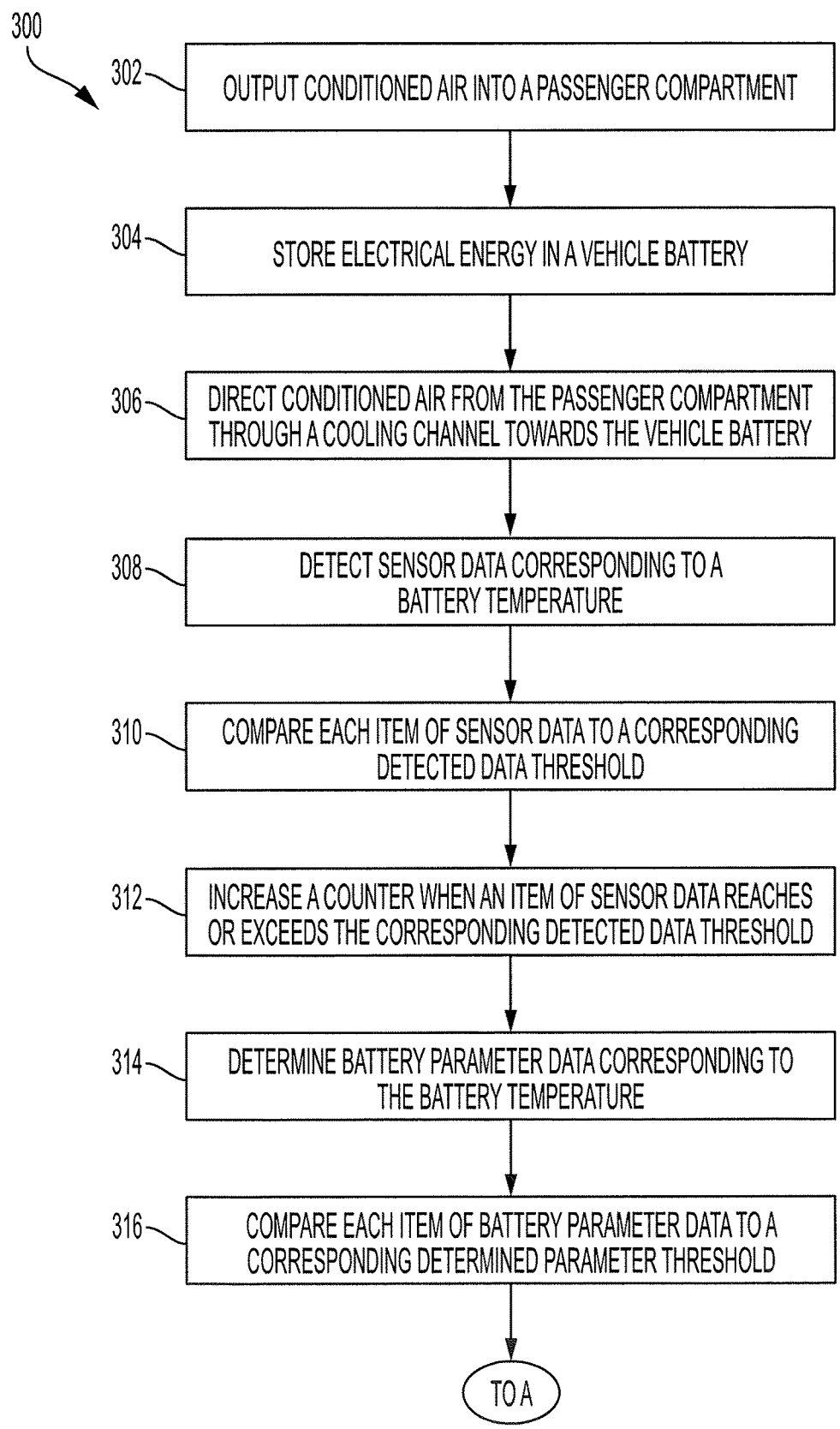
FIGS. 3A and 3B are flowcharts illustrating a method for adjusting a temperature of a vehicle component using a HVAC unit according to an embodiment of the present invention.
Figure 4:
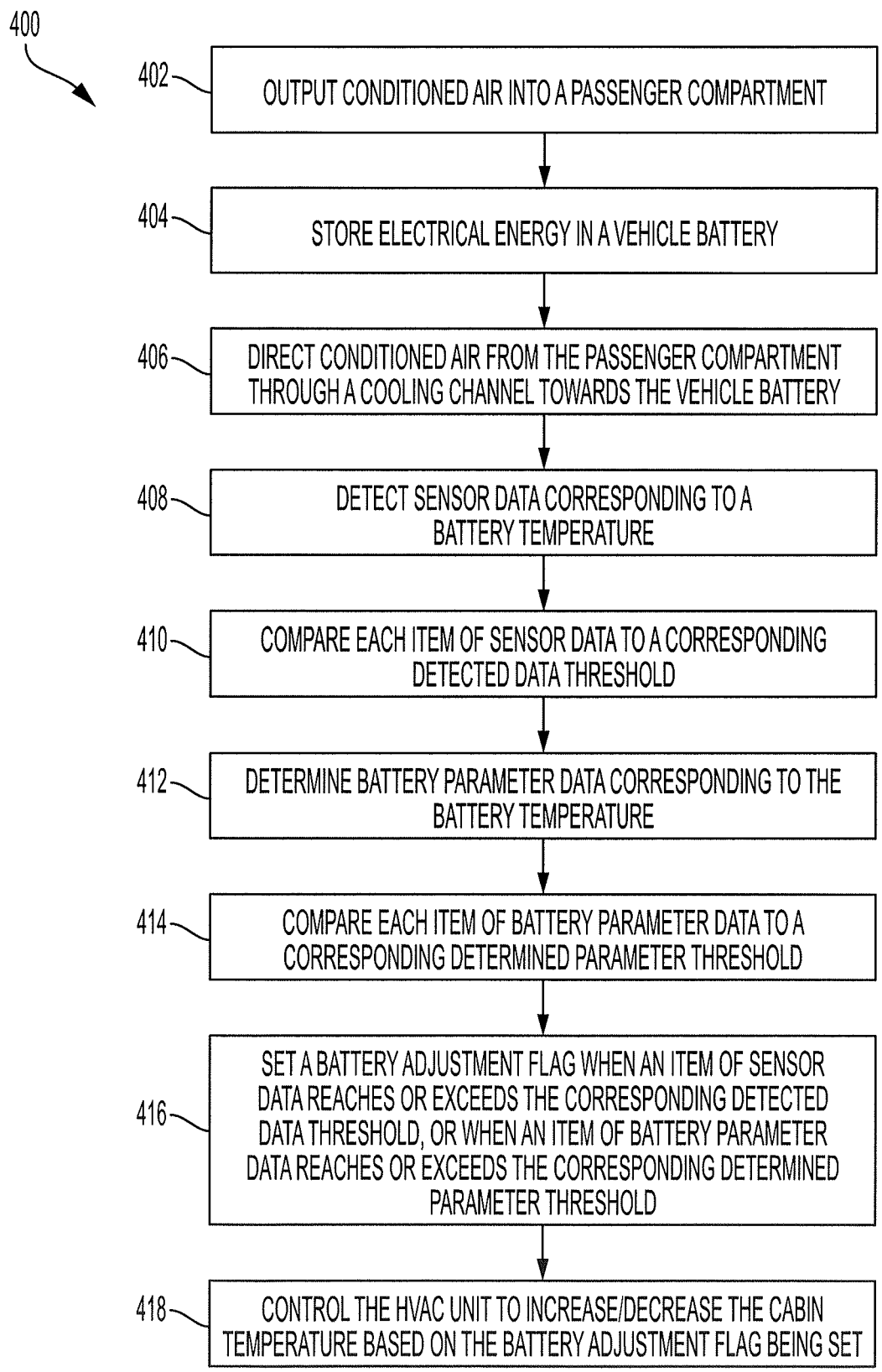
FIG. 4 is a flowchart illustrating a method for adjusting a temperature of a vehicle component using a HVAC unit according to an embodiment of the present invention.

Referring now to FIG. 4, a method 400 may be used to control a temperature of a vehicle component, such as a battery, by controlling an HVAC unit of a vehicle. Blocks 402 through 410 may be performed in a similar manner as blocks 302 through 310 of FIG. 3A. Likewise, blocks 412 and 414 may be performed in a similar manner as blocks 314 and 316, respectively, of FIG. 3A.

In block 416, the ECU may set a battery adjustment flag when at least one item of sensor data reaches or exceeds the corresponding detected data threshold or an item of battery parameter data reaches or exceeds the corresponding determined parameter threshold. The battery adjustment flag may corresponds to an indicator that it is desirable to adjust the battery temperature.

In block 418, the ECU may control the HVAC unit to increase or decrease the cabin temperature in order to increase or decrease the battery temperature when the battery adjustment flag is set. In that regard, the method 400 may be similar to the method 300 of FIGS. 3A and 3B. However, instead of having a counter and taking different actions based on the value of the counter, the method 400 may take a single action or set of actions when the battery adjustment flag is set.

For example, if the battery adjustment flag is set, the ECU may control the HVAC unit to perform each of the following actions. The ECU may control the HVAC unit to turn the air conditioning on. The ECU may further control the HVAC unit to cause the conditioned air flowing from the HVAC unit to be at a maximum cold level. The ECU may further control the HVAC unit to cause the conditioned air to flow from a foot vent (or a bi-level flow through the foot vent and an upper vent). The ECU may further control the HVAC unit to cause the conditioned air to flow from a rear vent. ECU may further control the HVAC unit to cause the air to flow at a maximum flow rate (such as by controlling a fan speed of a fan of the HVAC unit). In some embodiments, the ECU may perform any combination of these actions if the battery adjustment flag is set.

Figure 3B:
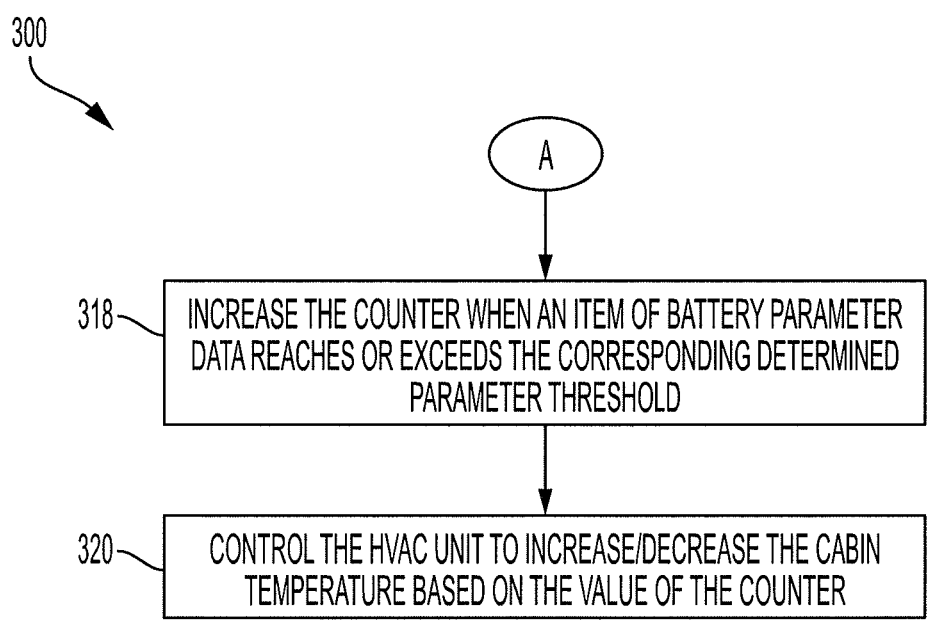
Figure 5A:
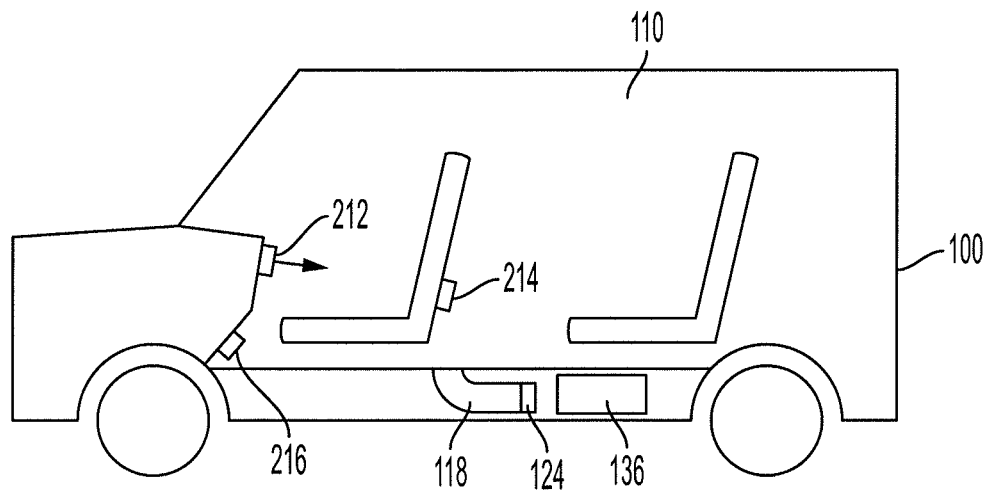
FIGS. 5A and 5B are drawings illustrating an exemplary use of the method of FIG. 4 using the vehicle of FIG. 1 according to an embodiment of the present invention.
Figure 5B:
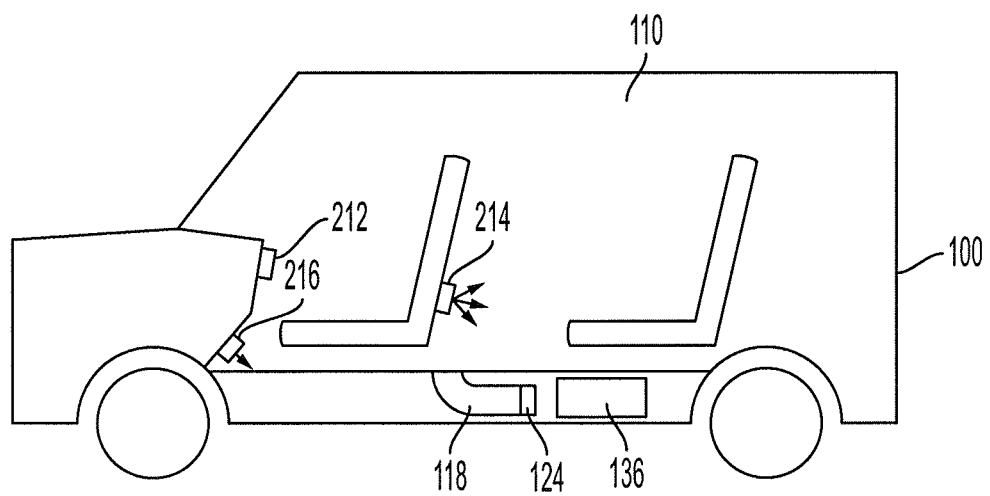

Referring now to FIGS. 1, 5A, and 5B, the vehicle 100 may perform a method similar to the method 300 of FIGS. 3A and 3B or the method 400 of FIG. 4. For example, the vehicle 100 may be performing the method 400 of FIG. 4. In FIG. 5A, the flag may be unset. In that regard, the air may flow through the front upper vent 212, as requested by a driver. However, after a period of time (such as an extended power request from the battery), the flag may become set. In FIG. 5B, the flag may be set and the ECU 102 may control the HVAC unit 112 to cause air to flow from the front floor vent 216 and the rear vent 214, at a maximum cold level, and at a maximum fan speed.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for vehicle component cooling in a vehicle, comprising:
   a main body defining a passenger compartment configured to support passengers of the vehicle;
   a heating, ventilation, and air conditioning (HVAC) unit located upstream from the passenger compartment and configured to output conditioned air into the passenger compartment;
   a vehicle component configured to generate heat and having a component temperature;
   a cooling channel located downstream from the HVAC unit and having an inlet located in the passenger compartment such that the passenger compartment is located upstream from the cooling channel and an outlet configured to output the conditioned air from the passenger compartment towards the vehicle component;
   at least one sensor configured to detect data corresponding to the component temperature of the vehicle component; and
   an electronic control unit (ECU) coupled to the HVAC unit, the vehicle component, and the at least one sensor, and configured to control the HVAC unit to increase or decrease a cabin temperature to adjust the component temperature based on the detected data.

2. The system of claim 1 wherein the ECU is further configured to determine a component parameter corresponding to the component temperature, and to further control the HVAC unit to increase or decrease the cabin temperature based on the component parameter.

3. The system of claim 2 wherein the ECU is further configured to increase a counter when the detected data reaches or exceeds a detected data threshold, to increase the counter when the determined component parameter reaches or exceeds a determined parameter threshold, and to control the HVAC unit to decrease the cabin temperature based on a value of the counter.

4. The system of claim 2 wherein the ECU is further configured to set a component temperature reduction flag when at least one of the detected data reaches or exceeds a detected data threshold or the determined component parameter reaches or exceeds a determined parameter threshold, and to control the HVAC unit to decrease the cabin temperature when the component temperature reduction flag is set.

5. The system of claim 2 further comprising a fan configured to direct the conditioned air over the vehicle component, wherein the determined component parameter includes at least one of a speed of the fan, a state of charge (SOC) of a battery, a vehicle mode of the vehicle, or a calculated component temperature of the vehicle component.

6. The system of claim 1 wherein the detected data includes at least one of an inlet temperature at the inlet, the component temperature, or an ambient temperature.

7. The system of claim 1 wherein the HVAC unit is configured to operate in any of a plurality of modes of operation, and the ECU is configured to control the HVAC unit to increase or decrease the cabin temperature by at least one of changing a mode of operation of the HVAC unit, adjusting a fan speed of the HVAC unit, adjusting a temperature of the conditioned air, or selecting at least one of front or rear blowers for the conditioned air to flow through.

8. The system of claim 1 wherein the inlet is configured to receive the conditioned air from the passenger compartment.

9. A system for vehicle battery cooling in a vehicle, comprising:
   a main body defining a passenger compartment configured to support passengers of the vehicle;
   a heating, ventilation, and air conditioning (HVAC) unit located upstream from the passenger compartment and configured to output conditioned air into the passenger compartment;
   a battery configured to store electrical energy and having a battery temperature;
   a cooling channel located downstream from the HVAC unit and having an inlet located in the passenger compartment such that the passenger compartment is located upstream from the cooling channel and an outlet configured to output the conditioned air from the passenger compartment towards the battery; and
   an electronic control unit (ECU) coupled to the HVAC unit and the battery, and configured to determine a battery parameter corresponding to the battery temperature and to control the HVAC unit to increase or decrease a cabin temperature to adjust the battery temperature based on the determined battery parameter.

10. The system of claim 9 wherein the battery parameter includes multiple battery parameters that each correspond to the battery temperature, and the ECU is further configured to increase a counter any one of the multiple battery parameters reach or exceed corresponding determined parameter thresholds, and to control the HVAC unit to decrease the cabin temperature based on a value of the counter.

11. The system of claim 9 wherein the ECU is further configured to set a battery temperature reduction flag when the battery parameter reaches or exceeds a determined parameter threshold, and to control the HVAC unit to decrease the cabin temperature when the battery temperature reduction flag is set.

12. The system of claim 9 further comprising a fan configured to direct the conditioned air over the battery, wherein the determined battery parameter includes at least one of a speed of the fan, the SOC of the battery, a vehicle mode of the vehicle, or a calculated battery temperature of the battery.

13. The system of claim 9 wherein the HVAC unit is configured to operate in any of a plurality of modes of operation, and the ECU is configured to control the HVAC unit to increase or decrease the cabin temperature by at least one of changing a mode of operation of the HVAC unit, adjusting a fan speed of the HVAC unit, adjusting a temperature of the conditioned air, or selecting at least one of front or rear blowers for the conditioned air to flow through.

14. A method for vehicle component cooling in a vehicle, comprising:
outputting, by a heating, ventilation, and air conditioning (HVAC) unit, conditioned air into a passenger compartment of the vehicle the HVAC unit being located upstream from the passenger compartment;
receiving or outputting, by a vehicle component having a component temperature, electrical energy;
directing, by a fan, the conditioned air from the passenger compartment through a cooling channel towards the vehicle component, the cooling channel being located downstream from the HVAC unit, and the passenger compartment being located upstream from the cooling channel;
detecting, by a sensor, data corresponding to the component temperature of the vehicle component; and
controlling, by an electronic control unit (ECU), the HVAC unit to increase or decrease a cabin temperature to adjust the component temperature based on the detected data.

15. The method of claim 14 further comprising:
determining, by the ECU, a component parameter corresponding to the component temperature; and
controlling, by the ECU, the HVAC unit to increase or decrease the cabin temperature further based on the component parameter.

16. The method of claim 15 further comprising:
increasing, by the ECU, a counter when the detected data reaches or exceeds a detected data threshold;
increasing, by the ECU, the counter when the determined component parameter reaches or exceeds a determined parameter threshold; and
controlling, by the ECU, the HVAC unit to decrease the cabin temperature based on a value of the counter.

17. The method of claim 15 further comprising:
setting, by the ECU, a component temperature reduction flag when at least one of the detected data reaches or exceeds a detected data threshold or the determined component parameter reaches or exceeds a determined parameter threshold; and
controlling, by the ECU, the HVAC unit to decrease the cabin temperature when the component temperature reduction flag is set.

18. The method of claim 15 wherein the determined component parameter includes at least one of a speed of the fan, a state of charge (SOC) of a battery, a vehicle mode of the vehicle, or a calculated battery temperature of the battery.

19. The method of claim 14 wherein the detected data includes at least one of an inlet temperature at an inlet of the cooling channel, the component temperature, or an ambient temperature.

20. The method of claim 14 wherein controlling the HVAC unit to increase or decrease the cabin temperature includes at least one of changing a mode of operation of the HVAC unit, adjusting a fan speed of the HVAC unit, adjusting a temperature of the conditioned air, or selecting at least one of front or rear blowers for the conditioned air to flow through.

* * * * *